(12) United States Patent
Liang et al.

(10) Patent No.: US 11,041,784 B1
(45) Date of Patent: Jun. 22, 2021

(54) DUAL-ARM CLAMPING TYPE HOLDER FOR TRANSMISSION ELECTRON MICROSCOPY GRIDS AND PREPARATION METHOD THEREOF

(71) Applicant: Institute of Microbiology, Chinese Academy of Sciences, Beijing (CN)

(72) Inventors: Jingnan Liang, Beijing (CN); Hao Liang, Beijing (CN); Yiwei Liu, Beijing (CN); Weina Sun, Beijing (CN); Chunli Li, Beijing (CN); Yuanming Luo, Beijing (CN); Zheng Fan, Beijing (CN); Tong Zhao, Beijing (CN); Shutao Sun, Beijing (CN); Qian Wang, Beijing (CN); Xiaolan Zhang, Beijing (CN)

(73) Assignee: Institute of Microbiology, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/140,045

(22) Filed: Jan. 2, 2021

(30) Foreign Application Priority Data

Jan. 7, 2020 (CN) .......................... 202010014620.6

(51) Int. Cl.
| | | |
|---|---|---|
| *G01N 1/00* | (2006.01) | |
| *G01N 1/28* | (2006.01) | |
| *G01N 23/2204* | (2018.01) | |
| *G01N 23/2202* | (2018.01) | |
| *G01N 1/31* | (2006.01) | |
| *G01N 1/30* | (2006.01) | |

(52) U.S. Cl.
CPC ............ *G01N 1/28* (2013.01); *G01N 23/2202* (2013.01); *G01N 23/2204* (2013.01); *G01N 1/30* (2013.01); *G01N 1/31* (2013.01); *G01N 2223/309* (2013.01)

(58) Field of Classification Search
None
See application file for complete search history.

(56) References Cited

U.S. PATENT DOCUMENTS 8,192,702 B2 * 6/2012 Norell ..................... C03B 23/04
422/549

* cited by examiner

*Primary Examiner* — Jyoti Nagpaul
(74) *Attorney, Agent, or Firm* — Zhu Lehnhoff LLP

(57) ABSTRACT

The present invention relates to a dual-arm clamping type holder for transmission electron microscopy grids and preparation method thereof. The preparation method comprises: firstly manufacturing a frame with two adjacent arms located on a same plane and have a clamping structure by a hard material; then putting the frame in a molten adhering liquid so that the frame is dipped with the adhering liquid; and finally, taking out the frame dipped with the adhering liquid, and waiting for the adhering liquid to solidify into adhering layers along the arms. The dual-arm clamping type holder manufactured by the method of the present invention comprises a frame and adhering layers; and the adhering layers adhere to the inner sides of the clamping structure between the two adjacent arms of the frame.

18 Claims, 6 Drawing Sheets

DUAL-ARM CLAMPING TYPE HOLDER FOR TRANSMISSION ELECTRON MICROSCOPY GRIDS AND PREPARATION METHOD THEREOF

This application claims the priority of Chinese Patent Application No. 202010014620.6, filed on Jan. 7, 2020, the entire disclosure of which is incorporated herein by reference.

TECHNICAL FIELD

The invention relates to a holder for carrying grids with biological ultrasections applied to observe biology ultrastructure by transmission electron microscope, in particular to a holder for carrying the grids with a high throughput in the sample staining process.

BACKGROUND ART

A metal grid is a sample carrier used in a transmission electron microscope. A copper grid is the most common metal grid. The copper grid comprises two parts which are respectively a copper ring with a rim width of about 0.2 mm and hollow grids inside the copper ring. The thickness of the whole copper grid is about 18 micrometers, and there is an organic Formvar membrane on the surface of the copper grid, which can effectively support section of samples. The staining process is occurred on the copper grid. Usually a pair of tweezers is needed for clamping the position of outboard rim width around the copper grid during the staining process. If the grid inner area of the copper grid is clamped by the tweezers, the Formvar membrane adhering to the surfaces of the grids may easily be damaged, and then cell sections loaded on the copper grid may be damaged, which affects observation. As the number of the grids with sections treated each time is large (4 to 20 grids with sections or even more), if each copper grid is stained one by one, the staining times of the sections on the grids are not uniform, and the sections are vulnerable to mechanical damage due to repeated operations.

In order to achieve the unification of the staining time of each grid with sections, there is a device for copper grids batch staining in the prior art. CN105910875A discloses a device which can perform batch staining on the copper grids. The device comprises a main body for fixing the copper grids and an auxiliary body for fixing and supporting the main body. The main body comprises soft layers and a hard layer covered by the soft layers, wherein the cross section of the hard layer is arc-shaped or angle-shaped. The copper grid is fixed in the device by the soft layers at the two sides of the arc-shaped opening or an angle-shaped opening.

In the above-mentioned device, the main body adopts a semi-closed structure, which causes the overall volume of the device to be relatively large, ultimately leading to a need to use more dye liquor when the device is used for batch staining. Besides the opening part of the device, grooves or slits are formed between the remaining part of the main body and the grids. When the device is removed from the stain liquor after completing the staining operation, some stain liquor in the grooves or slits will be taken out, thereby increasing the stain liquid consumption. In addition, the shielding formed by the semi-enclosed structure of the holder increases the time of rinse and air-drying steps after staining. Finally, the preparation of the above-mentioned device is highly dependent on a mold. As the soft layers are inside the semi-closed enclosing structure of the device, a complicated process is required to achieve the adhesion and clamping efficiency of the soft layers.

SUMMARY OF THE INVENTION

A main technical problem solved by the present invention is to provide a preparation method for a dual-arm clamping type holder for transmission electron microscopy grids which reduces dye loss, improves the efficiency of cleaning and air-drying operations, simplifies the preparation process, and can realize the batch dyeing of copper grids, and a dual-arm clamping type holder for transmission electron microscopy grids.

In order to solve the above technical problem, the present invention provides a preparation method for a dual-arm clamping type holder for transmission electron microscopy grids, comprising:

a. manufacturing a frame by a hard material; wherein the frame has at least two arms, and two adjacent arms are located on a same plane and have a clamping structure;

b. putting the frame in a molten adhering liquid, so that the frame is dipped with the adhering liquid; and c. taking out the frame dipped with the adhering liquid, and waiting for the adhering liquid to solidify into adhering layers.

Further, a method of reducing the loss of the adhering layers and improving the energy efficiency of the holder is provided. Specifically, by removing the adhering layers except on inner sides of two adjacent arms of the frame, not only can the adhering layers be recycled to a great extent, but also the contact area of the copper ring and wax layers can be reduced, so that the pressure is stronger, and the copper grid is easily inserted into and pulled out from the holder.

Further, a method of adjusting the thicknesses of the adhering layers is also provided. Specially, the thickness of each adhering layer decreases with the increase of liquid temperature, increases with the increase of the number of dipping operations, increases with the increase of dipping time, and increases with the increase of the solidification degree of wax liquid after each dipping operation except the last time.

A dual-arm clamping type holder for transmission electron microscopy grids, comprising a frame and adhering layers, the adhering layers adhere to inner sides of a clamping structure between two adjacent arms of the frame.

Further, the frame is made of a hard material and provides a basic surface for adhesion and molding of the adhering layers.

Further, the adhering layers are made of a soft material and used for fixing and supporting the copper grid.

Further, a section of the dual-arm clamping type holder is preferably single U-shaped.

Further, a section of the dual-arm clamping type holder is preferably parallel spiral type U-shaped.

Further, a section of the dual-arm clamping type holder is preferably closed ring-shaped.

In conclusion, the present invention has the following beneficial effects:

by eliminating the redundant frame of the holder, the space occupied by the holder is reduced. Further the amount of dye liquor required for staining is reduced. At the same time, the open structure adopted by the present invention effectively avoids the formation of grooves or slits between the holder and the copper grid, so that the amount of the dye liquor carried by the holder is close to zero. In addition, by adopting the open structure, the efficiency of a cleaning step and an air-drying step after dyeing is also improved. Furthermore, the preparation method of the device is simpler, and almost zero dependence on a mold can be realized when the frame is manufactured. Improvement in clamping efficiency of the adhering layers can be quickly realized by convenient technologies such as directly cutting off the peripheral excess wax layers along the wall of the frame.

BRIEF DESCRIPTION OF THE DRAWINGS

The accompanying drawings are used to provide a further understanding of the present invention and constitute a part of the specification. The drawings are used to explain the present invention together with the following exemplar examples, but do not constitute a limitation to the present application. In the drawings.

DETAILED DESCRIPTION OF THE INVENTION

Figure 1:
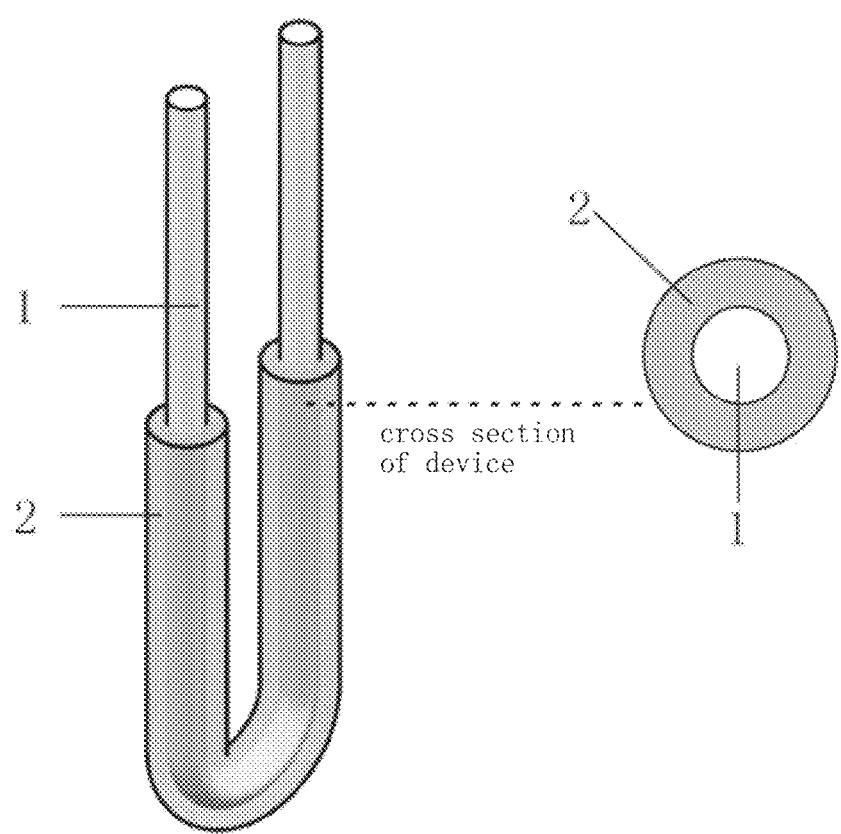
FIG. 1 shows a single U-shaped holder before efficiency improvement and a cross section of the holder.

The specific embodiments of the present invention will be described in further detail below in conjunction with the drawings and embodiments. The following examples are used to illustrate the present invention, but not to limit the scope of the present invention.

Example 1

This example provides a preparation method for a dual-arm clamping type holder for transmission electron microscopy grids, which specially comprises the following steps:

step 1. manufacturing a frame;

winding a hard material (such as iron wires, steel wires, glass and plastics) into the frame with at least two arms, wherein two adjacent arms are located on a same plane and have a clamping structure, and the distance between the two arms is 3-4.5 mm. The frame is single U-shaped, parallelly spiral type U-shaped or closed ring-shaped so as to provide basic surfaces for adhesion and molding of wax layers.

step 2. adhering the wax layers;

a. putting a solid wax (food grade beeswax or dental wax) into a container for heating;

b. after heating the solid wax to a completely molten state, putting the frame into the wax liquid for dipping the frame in the wax liquid;

Further, the thicknesses of the wax layers of the frame can be adjusted by controlling the time and number of times of the frame dipped in the wax liquid, the temperature of the wax liquid, and the solidification degree of the wax liquid after each dipping except the last time.

As shown in the table 1, under the condition that the single dipping time, the number of times of dipping and the solidification degree of the wax liquid after each dipping except the last time are the same, the thicknesses of the wax layers are inversely proportional to the temperature of the wax liquid. Under the condition that the temperature of the wax liquid, the single dipping time, and the solidification degree of the wax liquid after each dipping except the last time are the same, the thicknesses of the wax layers are directly proportional to the number of times of dipping. And under the condition that the temperature of the wax liquid, the single dipping time and the number of times of dipping are the same, the thicknesses of the wax layers are directly proportional to the solidification degree of the wax liquid after each dipping except the last time.

TABLE 1

Thickness of wax layer under different conditions

Figure 2:
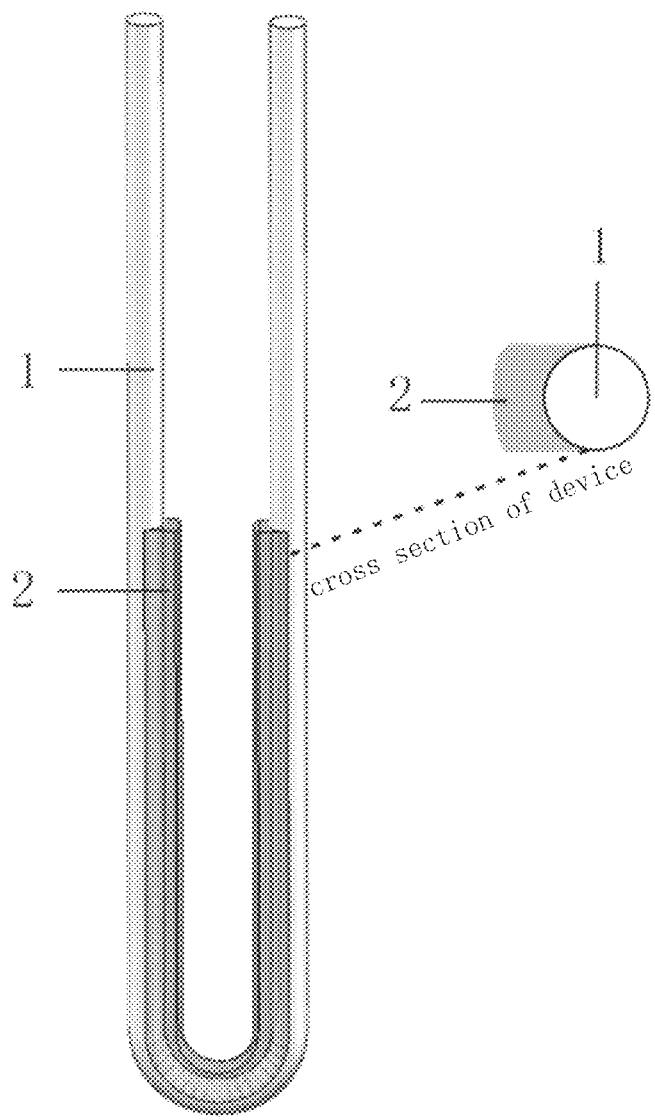
FIG. 2 shows a single U-shaped holder after efficiency improvement and a cross-section of the holder.

| Wax liquid temperature (DEG C) | Wax liquid dipping mode (error range) | Wax layer thickness (mm) | | | |
|---|---|---|---|---|---|
| | | Dipping 1s × 1 number of times | Dipping 2s × 1 number of times | Dipping 1s × 2 number of times (Dipping for the second time after the wax liquid dipped at the first time is half solidified) | Dipping 1s × 2 number of times (Dipping for the second time after the wax liquid dipped at the first time is completely solidified) |
| 80 | Horizonal (±10%) | 0.215 | 0.23 | 0.30 | 0.40 |
| | Vertical (±25%) | 0.27 | 0.35 | 0.41 | 0.51 |
| 75 | Horizontal (±10%) | 0.235 | 0.25 | 0.50 | 0.64 |
| | Vertical (±25%) | 0.3 | 0.54 | 0.53 | 0.68 |
| 70 | Horizontal (±10%) | 0.375 | 0.45 | 0.55 | 0.71 |
| | vertical (±25%) | 0.425 | 0.61 | 0.69 | 0.79 | c. taking the frame out of the wax liquid, and waiting for the wax liquid adhering to the frame to naturally solidify.

step 3. reducing consumption and improving efficiency;

As shown in FIGS. 1 and 2, taking the horizontal plane of the frame as the reference, the wax layers adhered to the inner sides of the clamping structure between two adjacent arms of the frame are retained, and the wax layers adhered to the front and back of the frame outside are cut off, thus, the contact area when the copper grid is inserted into the wax layers is reduced, the pressure of the contact points between the grid and the wax layers is increased, the insertion and extraction of the copper grid are facilitated, and the deformation of the copper grid is reduced; and the wax layers adhering to the outer edges of the two arms of the frame are cut off so as to reduce wax consumption and recycle wax.

The ideal working thicknesses of the wax layers on the inner sides of the two adjacent arms of the holder are 0.5-1 mm; and the ideal gap between the wax layers is 1-2.6 mm. When the wax layers adsorbed by the entire frame are too thick or the wax layers adhering to the lower part of the frame is too thick (after the frame is taken out of the wax liquid, the wax liquid adhered to the frame flows downward under the action of gravity, and thus, the wax layers adhered to the frame are thin on the upper part and thick on the lower part), the extra thick parts of the wax layers adhered to the two adjacent arms of the holder can be cut off according to actual needs so as to improve the efficiency or utilization rate of the holder.

Example 2

Figure 3:
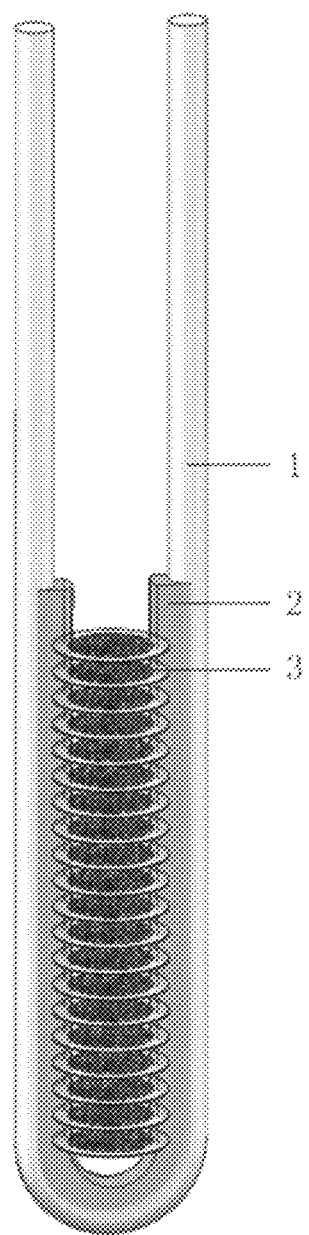
FIG. 3 shows a single U-shaped holder loading a copper grid.

FIG. 3 shows a single U-shaped holder loading a copper grid, which is manufactured by the method of the present application. The device comprises a single U-shaped frame 1 and adhering layers 2. The two arms included in the frame 1 provide basic surfaces for adhesion and molding of the adhering layers 2. The adhering layers 2 are used for fixing and supporting the copper grid 3. The copper ring part of the copper grid 3 can be inserted into and fixed to the inner sides of the adhering layers 2, and are arranged in sequence along the long axes of the arms. Specially, the single U-shaped frame 1 is made of a hard material (such as iron wires, steel wires, glass, plastics). The adhering layers 2 are made of wax layers (food grade beeswax or dental wax), and adhere to the inner sides of the U-shaped structure of the single U-shaped frame 1. The distance between the inner sides of the two arms of the single U-shaped frame 1 is 3-4.5 mm, and the distance between the inner sides of the adhering layers 2 is 1-2.6 mm. The copper grid 3 is a copper ring with an outer diameter of 3 mm, an inner diameter of 2.6 mm, and a rim width of about 0.2 mm. There are hollow grids ranging from 50 to 400 meshes within the ring inner area. The thickness of the entire copper grid 3 is about 18 micrometers. And there is an organic Formvar membrane on the front of the copper grid 3, which can effectively support section samples.

Figure 4:
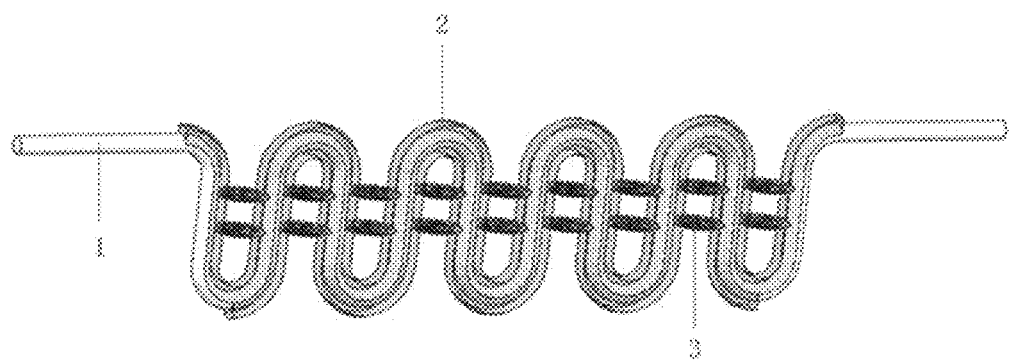
FIG. 4 shows a parallel spiral type U-shaped holder loading a copper grid.

FIG. 4 shows a parallelly spiral type U-shaped holder loading a copper grid, which is manufactured by the method of the present application. The holder comprises a parallelly spiral type U-shaped frame 1 and adhering layers 2. The two adjacent arms included in the frame 1 provide the basic surfaces for adhesion and molding of the adhering layers 2. The adhering layers 2 are used for fixing and supporting the copper grid 3. The copper ring parts of the copper grid 3 can be inserted into and fixed to the inner sides of the adhering layers 2, and are arranged in sequence along the long axes of the arms. Specially, the parallelly spiral type U-shaped frame 1 is made of a hard materials (such as iron wires, steel wires, glass, plastics). The adhering layers 2 are made of wax layers (food grade beeswax or dental wax), and adhere to the inner sides of the U-shaped structure of the parallelly spiral type U-shaped frame 1. The distance between the inner sides of the two adjacent arms of the parallelly spiral type U-shaped frame 1 is 3-4.5 mm, and the distance between the inner sides of the adhering layers 2 is 1-2.6 mm. The copper grid 3 is a copper ring with an outer diameter of 3 mm, an inner diameter of 2.6 mm, and a rim width of about 0.2 mm. There are hollow grids ranging from 50 to 400 meshes within the ring inner area. The thickness of the entire copper grid 3 is about 18 micrometers. And there is an organic Formvar membrane on the front of the copper grid 3, which can effectively support section samples.

Figure 5:
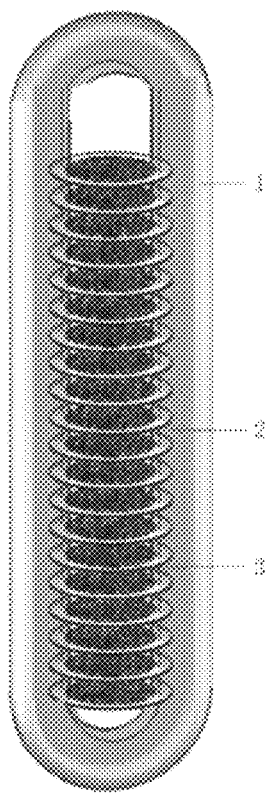
FIG. 5 shows a closed ring-shaped holder loading a copper grid.

FIG. 5 shows a closed ring-shaped holder loading a copper grid, which is manufactured by the method of the present application. The holder comprises a closed ring-shaped frame 1 and adhering layers 2. The two arms of the frame 1 provide basic surfaces for adhesion of the adhering layers 2. The adhering layers 2 are used for fixing and supporting the copper grid 3. The copper ring parts of the copper grid 3 can be inserted into and fixed to the inner sides of the adhering layers 2, and are arranged in sequence along the long axes of the arms. Specially, the closed ring-shaped frame 1 is made of a hard material (such as iron wires, steel wires, glass). The adhering layers 2 are made of wax layers (food grade beeswax or dental wax), and adhere to the inner sides of the two arms of the closed ring-shaped frame 1. The distance between the inner sides of the two arms of the closed ring-shaped frame 1 is 3-4.5 mm, and the distance between the inner sides of the adhering layers 2 is 1-2.6 mm. The copper grid 3 is a copper ring with an outer diameter of 3 mm, an inner diameter of 2.6 mm, and a rim width of about 0.2 mm. There are hollow grids ranging from 50 to 400 meshes within the ring inner area. The thickness of the entire copper grid 3 is about 18 micrometers. And there is an organic Formvar membrane on the front of the copper grid 3, which can effectively support section samples.

Figure 6:
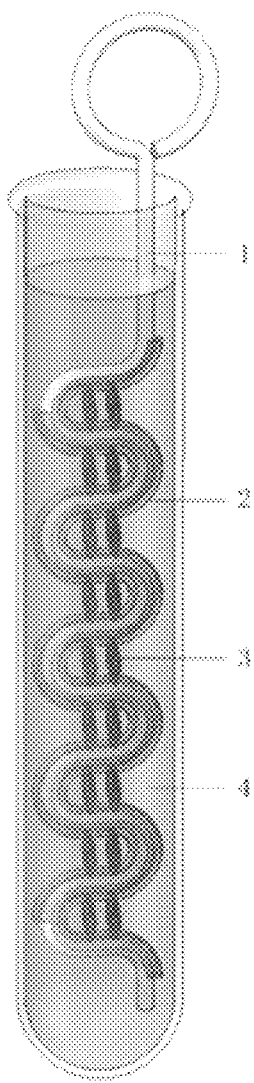
FIG. 6 shows batch staining of a copper grid.

FIG. 6 shows batch staining of the copper grids with sections, which is performed according to the present invention. The distance between the adjacent copper grids fixed to the adhering layers is greater than 2.5 mm to reduce the carry-over amount of staining liquor 4. The part of the holder loading the copper grids 3 is dipped under the liquid surface of the staining liquor 4 so as to achieve the batch staining of the copper grids.

The invention claimed is:

1. A dual-arm clamping type holder for transmission electron microscopy grids, comprising:
   a frame having at least two arms and a connecting part, wherein two adjacent arms at two sides of the connecting part are located on a same plane and have a clamping structure;
   adhering layers adhered to inner sides of the clamping structure between the two adjacent arms of the frame; and
   a plurality of metal grids for transmission electron microscopy supported by the frame, each metal grid comprising a metal ring and a mesh surrounded by the metal ring and having a top surface, at least one of the metal grids being disposed between the two adjacent arms of the frame with the top surface of the metal grid facing in a lengthwise direction of the two adjacent arms and with the metal ring fixed to the adhering layers on the inner sides of the two adjacent arms.

2. The dual-arm clamping type holder of claim 1, wherein the frame is made of a hard material.

3. The dual-arm clamping type holder of claim 1, wherein the adhering layers are made of a soft material.

4. The dual-arm clamping type holder of claim 1, wherein the longitudinal section of the dual-arm clamping type holder is single U-shaped.

5. The dual-arm clamping type holder of claim 1, wherein the longitudinal section of the dual-arm clamping type holder is parallel spiral type U-shaped.

6. The dual-arm clamping type holder of claim 1, wherein the longitudinal section of the dual-arm clamping type holder is a closed ring-shaped.

7. The dual-arm clamping type holder of claim 1 wherein the adhering layers are adhered only to the inner sides of the two adjacent arms.

8. The dual-arm clamping type holder of claim 1 wherein the two adjacent arms extend parallel to each other.

9. The dual-arm clamping type holder of claim 1 wherein the adhering layers are softer than the arms.

10. The dual-arm clamping type holder of claim 9 wherein the adhering layers comprise wax.

11. A dual-arm holder for transmission electron microscopy grids comprising:
    a frame comprising first and second arms each having a lengthwise direction parallel to the lengthwise direction of the other arm, and a first connecting part connected to a lengthwise end of each arm, each arm having an inner side facing the other arm and an outer side facing away from the other arm;

an adhering layer adhered to the inner side of each arm; and a plurality of metal grids for electron microscopy supported by the frame, each metal grid comprising a circular metal ring and a mesh which is surrounded by the metal ring and has a top surface, at least one of the metal grids being disposed between the first and second arms with the top surface of the mesh facing in the lengthwise direction of the arms and with the metal ring fixed to the adhering layer on the inner side of each arm.

12. A dual-arm holder as claimed in claim 11 wherein a plurality of the metal grids are disposed between the first and second arms with the top surface of the mesh of each metal grid facing in the lengthwise direction of the arms and with the metal ring of each metal grid fixed to the adhering layer on the inner side of each arm.

13. A holder as claimed in claim 11 wherein the adhering layer is not adhered to the outer sides of the arms.

14. A holder as claimed in claim 11 wherein the adhering layer is softer than the arms.

15. A holder as claimed in claim 14 wherein the adhering layer comprises wax.

16. A holder as claimed in claim 11 wherein the arms and the first connecting part form the shape of a single U.

17. A holder as claimed in claim 11 including a second connecting part connected to the first and second arms at an opposite lengthwise end of the arms from the first connecting part, wherein the arms and the first and second connecting parts form an elongated loop.

18. A holder as claimed in claim 11 further comprising a third arm extending parallel to the first and second arms, and a second connecting part connected between a lengthwise end of the second arm and a lengthwise end of the third arm at an opposite lengthwise end of the first and second arms from the first connecting part, wherein the adhering layer is adhered to a surface of the third arm opposing the second arm and a surface of the second arm opposing the third arm, and at least one of the metal grids is disposed between the second and third arms with the top surface of the mesh of the metal grid facing in the lengthwise direction of the third arm and with the metal ring of the metal grid fixed by the adhering layer on the second and third arms.

* * * * *